United States Patent [19]
Wasser et al.

[11] Patent Number: 5,713,576
[45] Date of Patent: *Feb. 3, 1998

[54] GAS LUBRICATED BARRIER SEAL

[75] Inventors: James R. Wasser, Des Plaines; Douglas J. Volden, Park Ridge; James P. Netzel, Skokie, all of Ill.

[73] Assignee: John Crane Inc., Morton Grove, Ill.

[*] Notice: The term of this patent shall not extend beyond the expiration date of Pat. No. 5,375,853.

[21] Appl. No.: 314,675

[22] Filed: Sep. 29, 1994

Related U.S. Application Data

[63] Continuation of Ser. No. 946,914, Sep. 18, 1992, Pat. No. 5,375,853.
[51] Int. Cl.⁶ ............................................. F16J 15/38
[52] U.S. Cl. ............................ 277/1; 277/38; 277/65; 277/96.1
[58] Field of Search ..................... 277/96, 96.1, 96.2, 277/59, 65, 27, 1, 81 R, 3, 17, 85, 38

[56] References Cited

U.S. PATENT DOCUMENTS

| | | |
|---|---|---|
| 2,853,020 | 9/1958 | Hollinger et al. |
| 3,527,465 | 9/1970 | Guinard. |
| 3,572,727 | 3/1971 | Greiner. |

(List continued on next page.)

FOREIGN PATENT DOCUMENTS

| | | |
|---|---|---|
| 297381 | 7/1989 | European Pat. Off. |
| 2030133 | 12/1971 | Germany. |
| 2444544 | 1/1976 | Germany. |

(List continued on next page.)

OTHER PUBLICATIONS

John Crane Inc. Drawing No. H–SP–11505, Dated Oct. 11, 1990, Publication or sale date: 1991.

John Crane Inc. Drawing No. H–SP–12582–1, Dated Oct. 11, 1990, publication or sale date: 1991.

(List continued on next page.)

*Primary Examiner*—Daniel G. DePumpo
*Attorney, Agent, or Firm*—Dorn, McEachran, Jambor & Keating

[57] ABSTRACT

A double, back to back oriented mechanical end face seal arrangement for use in sealing pumps or other devices used in fluid transfer of toxic or corrosive fluid has an intermediate buffer fluid chamber into which a relatively inert gas, such as nitrogen, is provided for use as a buffer fluid, and is maintained at a pressure which exceeds the process fluid pressure by at least 10 p.s.i. Each seal has a primary ring and a mating ring with gap maintaining means, such as spiral pumping grooves, formed in one of the rings which are shaped and dimensioned to pump the buffer gas through the first seal from the intermediate chamber into the process fluid chamber against the process fluid pressure and through the second seal from the intermediate chamber into the environment external to the housing and sealing area, thus avoiding the escape of the process fluid into the intermediate buffer chamber and thereby to the atmosphere. The inboard seal includes a first secondary sealing means disposed between one seal ring and the housing for sealing therebetween and a second secondary sealing means, disposed between the other seal ring and the shaft for sealing therebetween, the first and second secondary sealing means, which may comprise O-rings, each defining the boundary between the intermediate chamber and the process fluid chamber. The first and second secondary sealing means of the first rotary mechanical end face seal are sized and disposed to define radial walls in the back radial surfaces of each seal ring to thereby present essentially an equal area at an approximately identical radius, such that essentially the same mount of buffer fluid pressure acts on the back radial surfaces of each ring of the first rotary mechanical and face seal but in opposite directions and, on the process fluid side, the identical process fluid pressure acts on opposite sides of a portion of the respective rings of the first rotary mechanical end face seal essentially eliminating thrust forces acting on the first rotary mechanical end face seal.

26 Claims, 1 Drawing Sheet

U.S. PATENT DOCUMENTS

| | | |
|---|---|---|
| 3,743,302 | 7/1973 | Bach et al. |
| 3,767,212 | 10/1973 | Ludwig |
| 3,894,741 | 7/1975 | McHugh |
| 3,972,536 | 8/1976 | Warner et al. |
| 4,209,302 | 6/1980 | Orelup |
| 4,212,475 | 7/1980 | Sedy |
| 4,290,611 | 9/1981 | Sedy |
| 4,377,290 | 3/1983 | Netzel |
| 4,557,489 | 12/1985 | Wentworth |
| 4,755,469 | 7/1988 | Showalter et al. |
| 4,792,146 | 12/1988 | Lebeck et al. |
| 4,884,945 | 12/1989 | Boutin et al. |
| 4,889,350 | 12/1989 | Tranter |
| 5,058,905 | 10/1991 | Nosowicz et al. |
| 5,066,026 | 11/1991 | Heck et al. ............................ 277/96.1 |
| 5,213,340 | 5/1993 | Azibert ...................................... 277/65 |
| 5,217,233 | 6/1993 | Pecht et al. ............................ 277/96.1 |
| 5,249,812 | 10/1993 | Volden et al. |

FOREIGN PATENT DOCUMENTS

| | | |
|---|---|---|
| 3819566 | 12/1989 | Germany |
| 755955 | 9/1975 | South Africa |
| 2234788 | 2/1991 | United Kingdom |

OTHER PUBLICATIONS

John Crane Inc. Drawing No. H–SP–10979, date May 2, 1990.

Double–bellows seal non–contacting, Chemical Processing Magazine, p. 33, author unavailable, Sep. 1997.

Dulak, J.J., "Sealing Hazardous Gas" Reprinted from *Machine Design*, Mar. 8, 1990 issue, 2 pages.

Netzel, J. "Sealing systems keep pace with the times", Reprint from *PEM Plant Engineering and Maintenance*, Jan. 1989 issue, 4 pages.

Bulletin entitled "John Crane Type 28 Series Dry–Running Gas Seals" John Crane Inc. Indicated copyright date of: 1989.

Shah, P. "Dry Gas Compressor Seals" Published in the Proceedings of the 17th Turbomachinery Symposium, Nov. 1988.

Gabriel, R., "Fundamentals of Spiral Groove Noncontacting Face Seals" orginally presented at the Annual Meeting of Lubrication Engineers, Apr., 1978., 36 pages.

Brochure B2.539V Cranpac GmbH, publ. May 1985.

Brochure B1.501V Cranpac GmbH, publ. Apr. 1985.

"Compressor Seal Oil Systems", J. Read The South African Mechanical Engineer, vol. 39, Apr. 1989, pp. 176,180.

"Recent Developments on Non–Contacting Face Seals", J. Gardner, American Society of Lubrication Engineers, May, 1973.

"Dry Running Seal Technology", P. Wilde, John Crane, Inc., Apr. 1983.

"Upstream Pumping: New Developments in Mechanical Seal Design", Afzal Ali, John Crane, Inc. Apr. 1989.

"Gas Lubricated Mechanical Seals and Their Gas Supply Systems for Compressors", R. Kollinger, Burgmann.

Application Mechanical Seals, "Seal Technology, A Control for Industrial Pollution", J. Netzel, The Reporter, vol. I, Summer Issue 1991.

"Sealing Solutions", J. Netzel, Plant Engineering and Maintenance, Mar. 1991.

GAS LUBRICATED BARRIER SEAL

This is a continuation of application Ser. No. 07/946,914, filed on Sep. 18, 1992, now U.S. Pat. No. 5,375,853.

BACKGROUND OF THE INVENTION

1. Field of the Invention

The present invention relates generally to mechanical end face seals and more particularly relates to dual mechanical end face seals for use in sealing toxic or corrosive fluids.

2. Background Art

Mechanical end face seals have long been used to seal the space between a housing and a relatively rotating shaft which passes through the housing. Such seals usually include a primary ring which has a generally planar radial sealing face and is fixed to and mounted in the housing. The primary ring may be mounted on the housing by a secondary seal, such as an O-ring. In addition, the seal includes a mating ring which is mounted on the shaft for rotation therewith. Like the primary ring, the mating ring has a generally planar radial sealing surface. The mating ring radial surface is disposed in opposing relationship to the primary ring and the two radial surfaces are biased into sealing engagement. These types of seals are described in U.S. Pat. No. 4,212,475 issued to J. Sedy and assigned to the same assignee as the present invention.

Many configurations are known for utilizing either a single seal or a plurality of mechanical end face seals used together for specific seal applications. Single seal configurations are adequate for most sealing applications, including pumps, compressors, mixers and the like when utilized to seal fluids which are benign with respect to the environment. More recently, however, rising concern over pollution and toxic emissions has culminated in regulatory directives calling for "zero emissions" of toxic fluids into the environment. Thus, a need has arisen in the seal industry for seals which can provide a solution to the toxic fluid emission problem. Possible solutions which approached or met the zero emission standard have been proposed. These proposals have resulted in two broad categories of seal design, one type being known as "wet" double seals and the other type being magnetic drive pumps.

An example of the "wet" seals can be found in U.S. Pat. No. 4,290,611, issued to J. Sedy and also assigned with the present invention to a common assignee. That patent describes and illustrates a "double seal" arrangement (FIG. 1) which utilizes two mechanical and face seals oriented back to back along a drive shaft. The two seals define a chamber between them into which a lubricant buffer fluid is continuously circulated for cooling the seal rings. The buffer fluid, usually oil, is at a pressure generally 5–20 p.s.i. above the sealed process fluid pressure. The arrangement is described as being most desirable for sealing corrosive liquids because the metal parts of the seal are isolated from the process fluid by use of a non-corrosive buffer liquid.

The seal arrangements described in the '611 patent work well in certain applications, but cannot be used in applications where the sealed process fluid is a gas or where the sealed fluid is a liquid in which contamination by the buffer fluid cannot be tolerated. Generally, oil is used as a buffer fluid but many process fluids are reactive with the oil, or contamination by the oil in the process fluid is not desirable.

More recently, magnetic drive pumps have been developed which provide a "zero emission" capability, albeit at greater expense. For these types of applications, the shaft does not extend through the housing, but the shaft terminates at the housing wall thus eliminating the opening through which the shaft would extend. The impeller which pumps the fluid is encased in the housing chamber and is connected to a first set of magnets. The impeller is driven by a second set of magnets which are disposed externally of the chamber. Rotation of the externally disposed magnets by an external motor, in turn, rotates the magnets connected to the impeller inside the encasing housing chamber. Since the housing chamber is completely encased and does not include a shaft opening, no leakage of fluid can take place through the chamber wall under normal operating conditions.

The magnetic drive pumps are more complex and expensive than conventional mechanical end face seals. The magnets which drive the impeller are of special construction and special bearings are necessary to maintain the alignment of the magnets and the impeller shaft which provides the connection to the impeller. Moreover, magnetically driven pumps require a coolant fluid stream to remove waste heat generated by magnetic losses and by friction.

What is required by the industry is an inexpensive, easily constructed, seal which has a "zero emission" capability and which meets the regulations for toxic fluid emissions in an increasingly regulatory environment for general use.

SUMMARY OF THE INVENTION

Accordingly, the present invention provides for a seal arrangement for sealing against leakage of process fluid under pressure within a housing along a rotatable shaft extending through a wall of the housing, the seal arrangement generally comprising a first rotary mechanical end face seal including a stationary seal ring for sealing connection to the housing and a rotary seal ring for sealing connection to the shaft, each ring having an annular generally radial sealing face in relatively rotating, mating sealing relation with the face of the other ring, a second rotary mechanical end face seal including a stationary seal ring for sealing connection to the housing and a rotary seal ring for sealing connection to the shaft, each ring having an annular generally radial sealing face in relatively rotating, mating sealing relation with the face of the other of the rings, the first and second rotary mechanical end face seals being axially spaced along the shaft and arranged to define, with the housing, an intermediate chamber therebetween, each seal including means biasing one of the rings toward the other to maintain the annular sealing faces of each seal ring in relatively rotating sealing relation the relatively rotatable sealing rings of the first end face seal having one annular circumference of the sealing faces exposed to the process fluid to be sealed within the housing, and the other annular circumference of the sealing faces exposed to the intermediate chamber, the relatively rotatable sealing rings of the second seal having one annular circumference of the sealing faces exposed to the intermediate chamber, and the other annular circumference of the sealing faces exposed to the ambient environment external the housing, the intermediate chamber being in communication with the interior of the housing containing process fluid under pressure only across the relatively rotating, mating, sealing faces of the first rotary mechanical end face seal, the intermediate chamber being in communication with the ambient environment external to the housing only across the relatively rotating, mating, sealing faces of the second rotary mechanical end face seal, the intermediate chamber including means for connection to a source of relatively inert gas at a pressure exceeding the pressure of the process fluid present at the circumference of the annular seal faces of the first rotary mechanical end face seal rings.

In one embodiment of the invention, the radial face of one of the rings of the first rotary mechanical end face seal includes a plurality of spiral grooves extending from the circumference exposed to the relatively inert gas in the intermediate chamber, which may be the outer circumferential diameter of the seal rings, partially toward the circumference exposed to the process fluid in the interior of the housing, which may be the inner circumferential diameter, and defining on the face an annular dam adjacent the circumference exposed to the process fluid in the housing, or the outer circumferential diameter. The primary rings of both seals in the preferred form rotate together with the shaft. The preferable buffer gas is nitrogen.

DETAILED DESCRIPTION OF THE ILLUSTRATED EMBODIMENT

Figure 1:
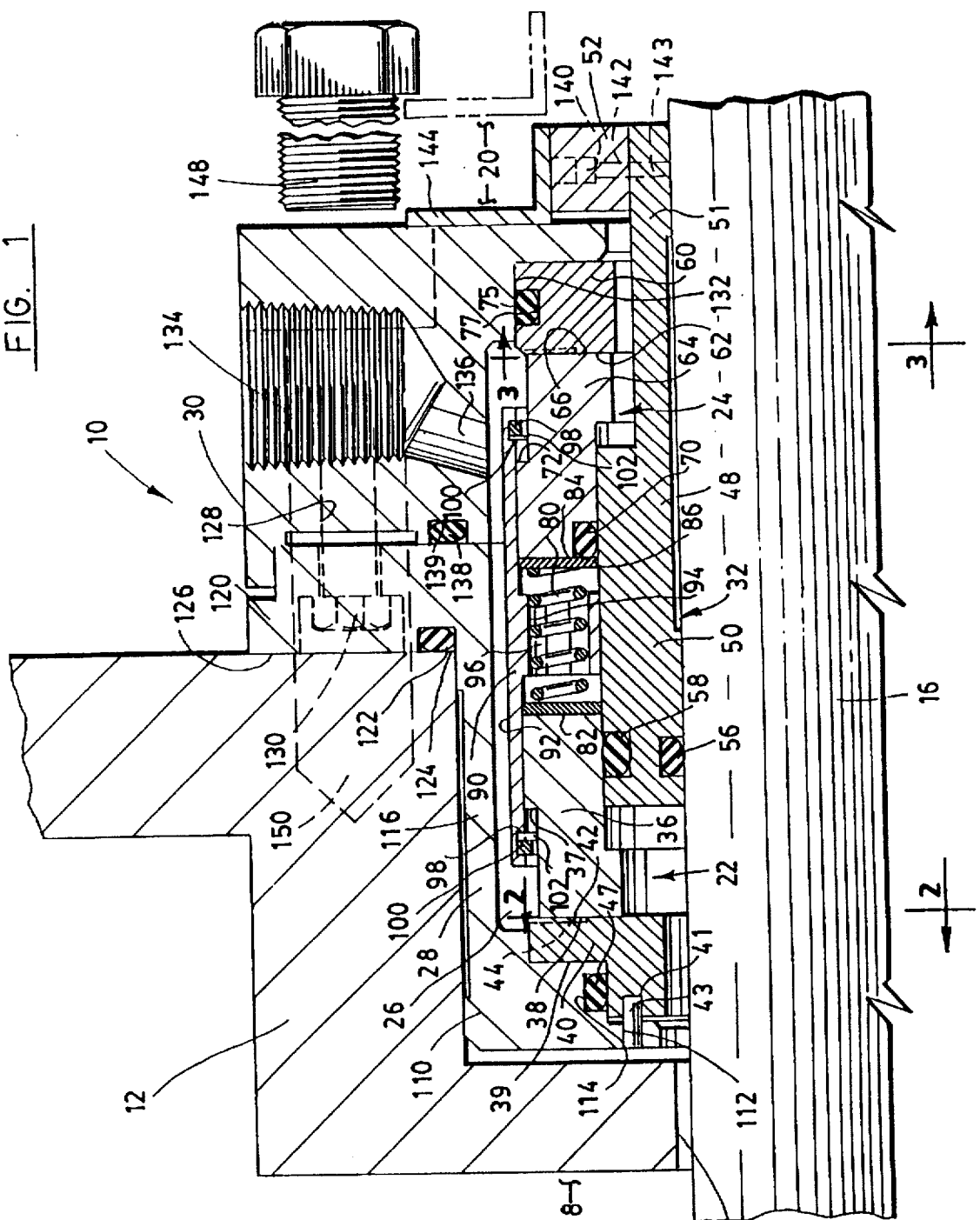
FIG. 1 is a cross section, axially, of a housing and shaft incorporating a preferred embodiment of the invention.

FIG. 1 illustrates a seal generally indicated at 10 constructed in accordance with the preferred embodiment of the present invention. The seal is designed to seal toxic fluids within a housing 12 so that literally "zero emission" of the sealed toxic process fluid is achieved and literally no process fluid escapes to the ambient environment external to the housing. The housing includes a shaft passage 14 which affords a shaft 16 to extend through the housing 12. The housing 12 may comprise a stuffing box, such as has used in the past for the stuffing of packing, the packing having been pressed against the shaft to minimize leakage through the housing and shaft interface. The housing 12 further separates an inner chamber 18 containing process fluid from the ambient environment 20 external the housing which generally comprises the atmosphere.

The seal arrangement of the preferred embodiment is disposed adjacent the housing 12 and generally within the stuffing box formed by the housing 12. A seal arrangement including double, back to back oriented, axially-spaced rotary, mechanical end face seals of the spiral groove type each have opposed ring portions respectively secured to the housing 12 and shaft 16. The seals are similar in most respects to the type shown and described in aforementioned U.S. Pat. No. 4,212,475.

The seal arrangement comprises a first seal, generally indicated at 22, adjacent the process fluid chamber 18 and enclosed by the wall of housing 12, and a second seal 24 adjacent the ambient environment 20 external to the seal arrangement and to the housing. The first and second seals 22 and 24 define an intermediate chamber 26 between them. The chamber 26 is surrounded by a liner assembly 28, which together with a flanged gland plate 30, define the other end wall of the intermediate chamber 26. The shaft 16 includes a sleeve assembly 32 which surrounds the shaft and which is a base on which the seal rings rest and around which the seals 22, 24 are disposed.

The first seal 22 includes a pair of annular rings comprising a rotating seal ring 36 and a stationary seal ring 40. Rotating seal ring 36 has a radially extending face 38 and a radially extending shoulder 37 disposed at the outer circumference. The rotating seal ring 36 is opposed to the stationary seal ring 40 having a radially extending face 42 opposite the face 38 of the rotating ring 36. The stationary seal ring 40 is also referred to herein as the mating ring 40 and the rotating seal ring 36 is also referred to herein as the primary ring 36. As will be described below, this relationship is not the only configuration of the seal rings possible in practicing the present invention. The primary ring 36 shown in the preferred embodiment is fixed relative to the shaft 16 and rotates therewith. The primary ring 36 is sealed against the sleeve 32, but is shaped and dimensioned to have freedom of motion axially relative to the sleeve 32 and shaft 16 at least to a limited degree.

As shown in FIG. 1, the primary ring 36 is fixed in the rotational direction relative to the sleeve assembly 32 for rotation therewith. However, it is possible in an alternative embodiment (not shown) to have the primary ring fixed relative to the housing, and the mating ring to be rotating with the shaft. In that embodiment, suitable modification of the arrangement within the skill of a person knowledgeable in the art would be necessary to accommodate such an alternative design.

The mating ring 40 has a face 42 in facing relation to face 38 of the primary ring 36. When they are brought together, the faces 38 and 42 interface and provide the sealing function of the seal 22. The interface need not be co-extensive with both of the faces 38 and 42, but as is shown in FIG. 1, the face 38 of the primary ring 36 extends only part way across the face 42 of the mating ring 40.

Figure 2:
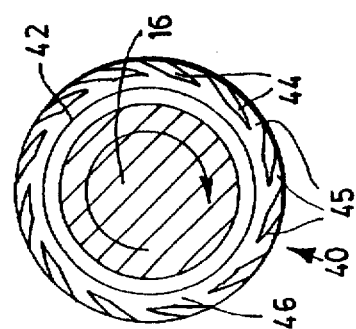
FIG. 2 is an end view of one of the sealing rings of the preferred embodiment of the invention.

The interface between faces 36 and 42 is in the shape of an annular disc, with the shaft 16 extending through the central aperture of each ring. As shown in FIG. 2, the mating ring 40 includes a plurality of spiral grooves 44 disposed partially across the face 42 of ring 40, and extending from the outer circumferential diameter toward the inner circumferential diameter thereof. The grooves 44 are also illustrated in phantom in FIG. 1 but the depth of the grooves is exaggerated for illustrative convenience. As is described in aforementioned U.S. Pat. No. 4,212,475, the depth of the grooves is on the order of 50 to about 400 microinches. In the preferred embodiment, the grooves are about 300 microinches in depth.

Referring to FIG. 2, grooves 44 are circumferentially and evenly spaced and are separated by plural radially extending lands 45. An ungrooved surface at the inner diameter of seal face 42 defines a sealing dam 46 which, in cooperation with the opposed face 38 of the primary seal ring 36, provides a static seal when the shaft 16 is not rotating. When shaft 16 is not rotating, the process fluid is sealed by a hydrostatic film between the primary and mating rings at the sealing dam 46. When the shaft starts rotating, interaction of the grooves 44 with the rotating face 38 of ring 36 normally pumps a fluid present in the chamber 26 radially inwardly across the seal faces 38, 42, causing the seal faces to open slightly to present a gap between the faces. The fluid which is pumped into the gap maintains a non-contacting condition between the seal faces and also acts to cool the faces of excess heat which is generated by shear frictional forces of the relatively rotating seal faces.

At the end of the mating ring 40 opposite from that of the face 42, (FIG. 1), there is a depression or bore 41 which is disposed to receive a retainer pin 43 to fix ring 40 relative to the liner assembly 28 and to the housing 12. The retainer pin is generally an element of the liner assembly 28 and may be an integral element which is machined as a portion of the assembly. Preferably, the retainer pin 43 is a separate element which is press fitted into the liner during manufacture.

An O-ring 47 is used to seal the mating ring 40 to the liner assembly 28. A shoulder in the outer circumferential wall of the primary ring 40 provides for a radially extending annular wall 39 which abuts a corresponding radially extending wall of the liner assembly.

The seal 22 is shown having the grooves 44 at the radially outer diameter adjacent the intermediate chamber 26 and the sealing dam 46 at the radially inner diameter adjacent to and being exposed to the process fluid within the chamber 18. The principles of the invention, however, are applicable to seals having the grooves at the inner diameter and the dam at the outer diameter, with the inner diameter grooves being exposed to the buffer fluid within the intermediate chamber. Such an alternate embodiment (not shown) may require a different configuration of the rings, e.g., with the mating ring rotating and the primary ring stationary. It is within the skill of those in the art to design an alternative configuration with the stated characteristics upon achieving an understanding of the present invention.

The sleeve assembly 32 includes a shaft sleeve 48 which fits upon the shaft 16. Sleeve 48 includes a thicker portion 50 at one end, which is recessed to provide a thinner portion 51 at the other annular end of the sleeve 48. The sleeve 48 is fixed to the shaft 16 by a collar 52 secured to the thinner portion 51 of sleeve 50 by a bolt, as will be explained below. Alternatively, a drive key arrangement (not shown) may be used to secure shaft sleeve 48 to the shaft 16. Sleeve assembly 32 further includes an O-ring 56 for sealing between the thicker portion 50 and the shaft 16, and another O-ring 58 for sealing between the primary ring 36 and the thicker portion 50. The recessed thinner portion 51 of sleeve 48 accommodates assembly of other portions of the seal arrangement, such as the elements of the second seal 24.

The O-rings 56 and 58 are fit into appropriate grooves in the thicker portion 50, and the outer diameter O-ring 58 is shaped, sized and configured to permit axial motion of the primary ring 36. The O-ring 58 is of a diameter as close as possible to the diameter of O-ring 47. O-rings of the same diameter enhances seal balance of the seal 22 because it tends to equalize the forces which arise from the process fluid pressure which is present in chamber 18. The O-rings set the radial location of the boundary between the pressure of the buffer fluid and of the process fluid, as will be explained below. The O-rings 47,58 thus define the balanced pressure acting on radially extending surfaces of each of the seal rings 36 and 40. The higher pressure buffer fluid acts on the radially extending walls 39 of seal ring 40 while a simultaneous and opposite force acts on the face of the seal ring 36 which is opposite the seal ring 36 from the face 38. Because the annular widths in the radial direction of the wall 39 and the non-contacting radial face of ring 36 present essentially an equal area at an approximately identical radius, essentially the same amount of buffer fluid pressure acts on each of the rings albeit in the opposite directions. On the process fluid side, the identical process fluid pressure acts on opposite sides of a portion of mating ring 40 and on a portion of primary ring 36. Thus, the pressure forces on each of the rings cancel each other out, thereby essentially eliminating thrust forces acting on the seal 22.

Seal 24 also includes a pair of annular rings. One ring comprises a stationary ring 60 having a radially extending face 62. The stationary seal ring 60 is opposed to the other ring, rotating ring 64, also having a radially extending face 66 opposite the face 62 of stationary ring 60. The stationary seal ring 60 of second seal 24 is also referred to as the mating ring seal 60 and the rotating seal ring 64 is also referred to as the primary seal ring 64.

Primary seal ring 64 is not identical in construction to the ring 36. For example, a recessed groove 68 in the primary seal ring end opposite the seal face 66 provides accommodation for an O-ring 70 which seals between the ring 64 and the thicker portion 50 of the sleeve 48. In many respects, including the disposition of the O-ring 70, the second seal 24 is similar to the seal described and illustrated in aforementioned U.S. Pat. No. 4,212,475. In one important respect, however, seal 36 is different from that of the seal described in that patent. The disclosure in the '475 patent describes the primary ring fixed to the housing within a retainer. However, in the preferred embodiment of the present invention, the primary ring 64 is rotating and the mating ring 60 is stationary. Different design considerations are applicable in either case. For example, the retainer of the seal in the patent includes an elongated inner diameter wall on which an O-ring seals against the primary ring whereas in the present invention, the corresponding O-ring 70 rests on the sleeve 48. Nevertheless, the teaching of the present invention is applicable to seal configurations having any of a number of designs which may be within the purview of those having ordinary skill in the art.

Referring again to FIG. 1, a shoulder in the outer circumferential wall of the primary ring 64 provides for a radially extending annular wall 72.

The mating ring 60 of seal 24 is also different from that of mating ring 40. Mating ring 60 is an annular ring with an annular groove 77 disposed in the outer circumference for receiving an O-ring 75. The O-ring 75 provides a seal between mating ring 60 and gland plate 30.

Figure 3:
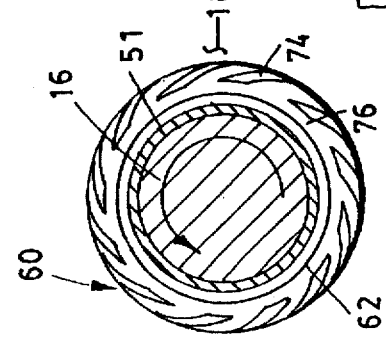
FIG. 3 is an end view of the other of the sealing rings of the preferred embodiment of the invention.

Referring to FIG. 3, where an elevation view of the seal face 62 of ring 60 is illustrated, seal face 62 also includes a plurality of circumferentially spaced spiral grooves 74. The grooves extend partially across the radial width of mating ring seal face 62 and are also shown in mating ring 60 of FIG. 1, the width being exaggerated for illustrative convenience. An ungrooved surface at the inner diameter of seal face 62 defines a sealing dam 76 which, in cooperation with the opposed sealing face 66 of the primary ring 64, provides a static seal when the shaft 16 is not rotating, similar to the dam 46 of seal 22. During shaft rotation, the shaft 16 and primary ring 64 rotate relative to the mating ring 60 and the interaction of the rotating face 66 of primary ring 64 and the spiral grooves 74 in seal face 62 acts to pump the buffer fluid within intermediate chamber 26 across the seal interface of seal 24 and into the ambient environment 20.

Utilization of stationary mating rings 40, 60 together with the faces 42, 62 including the spiral grooves 44, 74 respectively, is the reverse of most seal designs. It has been found, however, that whether the rings having the spiral grooves are disposed on a rotating ring, as in the seal described in aforementioned U.S. Pat. No. 4,212,475, or whether the rings having the grooves are maintained stationary, as in the present invention, does not provide an appreciable difference in the amount or direction of the pumping action on the fluid.

It is believed that a film of fluid rides together with the rotating ring, despite its relatively smooth, flat surface, and despite the absence of the spiral pumping grooves on the rotating ring. The phenomenon of the fluid film rotating on and with a smooth seal face results from a laminar flow, with the relative flow being provided to the stationary liquid by the rotation of the faces 42,62 of rings 40,60. As the fluid film meets the faces 42,62 of mating rings 40,60, the fluid film is constrained by the grooves 44, 74 and is forced radially inwardly along a surface boundary layer on each face 42,62. Although each ring having the spiral grooves is retained stationary, the action of the laminar flow is sufficient to pump enough fluid between the faces and create the gap between the faces during relative rotation between the faces.

A biasing force is necessary to counteract the tendency to increase the gap created by the fluid. If the gap becomes too great, the leakage of fluid from the high pressure side of the seal becomes excessive and needs to be brought under control. Referring again to FIG. 1, a biasing force is provided to each of the primary rings 36,64 by a single set of plural springs 80 evenly disposed around the circumference of the annular primary rings 36, 64. Springs 80 press directly onto a pair of discs 82,84 which abut the faces of each primary ring 36,64, respectively, which faces are opposite the sealing faces 42,62, respectively. Thus, the force of springs 80 counteracts the opening force of the spiral grooves while the pressure forces acting on each of the rings 36,64 counteract each other.

The springs 80 are held in place by a retainer 90 having a cylindrical outer circumferential wall 92. The retainer 90 has an elongated inner wall 94 defining an annular space which at one end accommodates mating seal ring 40 of seal 22 and at the other end accommodates mating seal ring 60 of seal 24.

Along a central portion of inner diameter wall 94, is an annular disk element 96. In the preferred embodiment, the disk element 96 is integral with the retainer 90. Disk element 96 includes a plurality of apertures 98 which extend therethrough. The apertures 98 have a sufficiently large diameter to permit insertion of the springs 80 therethrough. The retainer 90 and disk element 96 thus retain the springs 80 in both circumferential and radial positions. Even spacing of the springs 80 around the circumference of disk element 96 provides an even bias on the mating rings 40, 60 around the full circumference of the rings 40,60. In the preferred embodiment, there are four springs disposed at regular 90° intervals within the disk element.

The retainer 90 at an inner diameter of disk element 96 is adjacent the thicker portion 50 of sleeve 48. A plurality of set screws (not shown) extend radially through bores which are radially disposed in the disk element separated from the axial apertures 98. The set screws impinge on the outer circumferential surface of the sleeve, whereby the retainer 90 becomes fixed in the axial and circumferential directions relative to the sleeve 48. Thus, the retainer 90, disk element 96, primary rings 36,64 and the springs 80, all rotate together with the shaft 16 during operation of the device in which the seal arrangement is used.

The inner diameter of the cylindrical retainer 90 further includes adjacent each end an internal groove 98 for receiving a snap ring 100. Each snap ring 100 fits within the groove 98 and provides a radially extending wall 102. Wall 102 of one snap ring 100 interfaces with wall 37 of primary ring 36 to retain the ring within the retainer 90. Similarly, wall 102 of the other snap ring 100 interfaces with the radially extending wall 72 of primary ring 64 to retain the ring within the retainer 90. Under normal operating conditions, however, each primary ring is preloaded during assembly so that the walls 37,72 of the respective primary rings are separated from the snap ring walls 102.

As described above, a liner assembly 28 fits within the packing housing formed by wall 12 and encloses a portion of the arrangement, including seal 22 and a part of the retainer assembly 90. Liner assembly 28 comprises an inner diameter annular support flange portion 110 which is shaped and configured around its inner diameter to receive the mating ring 40 of seal 22. Radially extending wall 39 of ring 36 closely abuts a corresponding radially extending wall of the flange portion 110.

The flange portion 110 further includes a plurality of axially extending pin receiving bores 112 for receiving pins 43 to provide stationary engagement between the flange portion 110 and the mating ring 40. An annular groove 114 provides a sealing receptacle for receiving the O-ring 47 which seals between the liner assembly 28 and the primary ring 36.

An outer diameter flange portion 120 of liner assembly 28 is attached to the inner diameter support flange portion 110 by an elongated tubular portion 116. Tubular portion 116 has an outer diameter that fits within the housing wall 12, but does not necessarily seal against it. A fluid tight seal between liner assembly 28 and housing 12 is provided by an O-ring 122 which fits within a groove 124 in the outer diameter corner between the outer diameter flange portion 120 and the tubular portion 116. Groove 124 has a diameter at one of its axially extending walls which is identical to the outer diameter of the tubular portion 116, so that it can be considered as an extension of the outer diameter wall of tubular portion 116. In this position, when a radially extending wall 126 of outer flange portion 120 is brought flush with the wall of housing 12, the O-ring 122 is pressed against the housing wall to seal between the liner assembly 28 and the housing 12. Sealing load in the axial direction is preferable to that in the radial direction because the liner can be more easily installed by sliding the tubular portion with the packing housing.

The outer flange portion 120 preferably includes a connection to the wall of housing 12, as will be described below. Several bolts 130, shown in phantom, extend through a set of equidistantly disposed recessed bores 128, shown in phantom, in the radial wall of the outer diameter flange portion 120 to connect the liner assembly 28 to the flanged gland plate 30.

Gland plate 30 includes an inner diameter portion which has axially extending inner diameter sealing surface 132 against which the O-ring 75 is sealed. The depth of groove 77 which is disposed in the outer circumferential diameter of mating ring 60 provides enough clearance to enable the mating ring 60 to be press fitted into the annular shoulder formed by surface 132. Together with the O-ring 75, a fluid tight seal is effected between the mating ring 60 and the gland plate 30.

Gland plate 30 includes an inlet port 134 and a passageway 136 for a fluid connection between the intermediate chamber 26 and the inlet port 134. The inlet port 134 is itself connected to and in fluid communication with a source of a gas which is non-hazardous to the environment but which is compatible with use of a specific process fluid. Any relatively inert gas, or a gas which is non-reactive with the process fluid, may be utilized as a buffer gas. Nitrogen gas is preferable as a relatively inert gas because of its low cost and easy availability, but a noble gas, such as argon, neon, or the like, may also be considered appropriate in certain applications. In a limited number of other applications, air may be used as the buffer fluid if its use is compatible with the process fluid.

Alternatively, a gas that is reactive with the process fluid may also be used in certain applications in which the reaction is desirable, such as when the buffer gas is to be added to the process fluid at some stage of the process fluid processing. As an example, the introduction of carbon dioxide into the process fluid may be performed as part of the chemical processing of the process fluid. When used in this way, close measurement of the amount of buffer fluid introduced into the process fluid is important, and a calculation of the buffer fluid volume pumped into the process fluid by the spiral grooves may be necessary to provide only that amount of carbon dioxide which is necessary for the desired chemical reaction to occur.

In the preferable environment, the buffer fluid gas is at a pressure exceeding the maximum expected process fluid pressure. Preferably, the source of nitrogen provides a nitrogen stream to the inlet port 134 at about 10 p.s.i. above the maximum process fluid pressure. The nitrogen source may be provided by any of a number of possible means. For example, for an application in a chemical plant, the nitrogen source may be a piped-in line of nitrogen which results from by-products of various chemical process and which is readily available throughout most chemical plants. The pressure of the nitrogen supplied to the inlet port may be regulated to the desired level between the line source and the inlet port.

Alternately, the source may be a bottled nitrogen source at high pressure which also requires a regulator for a supply of nitrogen at the desired pressure. In the preferred embodiment, the inlet port is disposed at the highest point of the gland plate 30 for convenient access but this is not necessary for operation and in other configurations, it may be desirable to provide an inlet port at a different position and oriented at a different angle as befits a particular application.

The collar 52 is axially disposed outside the immediate seal arrangement and provides a connection between the sleeve 32 and the shaft 16. The axial position of the sleeve 32 is important in providing clearance of the axially movable elements in each seal. To ensure that the sleeve is axially disposed at the proper location, the collar in 52 is fit over the sleeve 32 and connected thereto by set screws 140 shown in phantom. The set screws 140 extend through the sleeve 32 and into a predetermined axial bore 142 in the shaft 12, thereby connecting the three elements together and axially fixing each relative to the other.

The proper spacing of the sleeve 32 relative to the gland plate 30 and to the other elements of the seals 22,24 is effected by use of a plurality of spacers 144. Each spacer 144 is a right angled strip with two legs, one leg being connected to collar 52 and the other leg to gland plate 30 by cap screws (not shown) which extend in threaded bores (not shown) appropriately disposed in the collar 52 and in the gland plate 30.

Spacer 144 is used only during assembly of the seal arrangement onto the shaft 16, and is removed once that assembly is completed, as is symbolized by the spaced apart spacer shown in phantom. Nevertheless, it is shown as being connected in FIG. 1 to indicate the relation between the seal arrangement elements. Removal of spacer 144 after completion of assembly does not change the relative positions of those elements.

The materials comprising specific elements are commercially available and in most respects standard in the sealing industry. In the preferred embodiment, each of the primary rings 36, 64 are carbon graphite rings and the mating rings 40,60 are silicon carbide or tungsten carbide. The spring 80 is stainless spring steel and the liner, the gland plate 30, the sleeve 32, the collar 52, the spacer 144 and the various cap and set screws may all comprise an appropriate steel, such as 316 stainless steel.

The O-rings which are exposed to a process fluid, which in most cases is intended to be corrosive or toxic. Thus, the O-rings must comprise a material which is relatively impervious or chemically resistant to a majority of corrosive fluids. Accordingly, O-rings 47,56 and 58 comprise a chemically resistant elastomer, such as perfluoroelastomer. The expense of this material precludes its extensive use for all of the O-rings throughout the seal arrangement. O-rings 70, 75 and 138 each may comprise an elastomeric material which is generally used for O-rings, such as a fluorocarbon elastomer, chloroprene, ethylene propylene or nitrile. During normal operation of the seal arrangement, the O-rings 70, 75 and 138 are not exposed to the corrosive process fluid, and thus there is no requirement of a chemically resistant or impervious elastomeric material for those O-rings.

The assembly of the seal arrangement 10 must proceed in accordance with a predetermined procedure. The preferable construction of the seal arrangement 10 is as a cartridge permitting assembly of a majority of the seal off-site from where the seal will be used. Thus, the only on-site assembly which would be required in that case would be the installation of the seal arrangement cartridge, connecting the gland plate 30 to the housing 12 and adjusting the axial position of the sleeve 32.

Assembly of the cartridge at an off-site manufacturing plant would begin by disposing the disc 84 in one end of the retainer 90 and sliding the disc toward the retainer central disk portion 96. The O-ring 70 is then fit within the annular shoulder 84 of primary ring 64 and the primary ring 64 is placed into the retainer 90 with the face opposite the seal face 66 abutting the disc 84. Snap ring 100 is then disposed within groove 98 to retain the primary ring 64 within the retainer 90.

The next step is sliding the retainer 90 together with the primary ring 64, the disc 84 and the O-ring 70 over a sleeve 32 from the end with thinner portion 51 toward the thicker portion 50, until the inner diameter of the disc 84, the O-ring 70 and the inner diameter of the primary ring 64 engage the outer diameter of the sleeve thicker portion 50.

The springs 80 are then placed in the appropriate bores 94, around the retainer central disc portion 96 from the other end of the retainer 90 so that the springs 80 engage the disc 84. Disc 82 is then slid from the other end of the retainer 90 until the disc contacts the spring 80. O-ring 58 is disposed within the outer diameter groove of sleeve 32 and primary ring 36 is inserted within the opposite end of the retainer 90 so that the back face, opposite from sealing face 38 contacts the disc 82. Care must be taken in the insertion of primary ring 36 so as to avoid squeezing or catching an inner diameter corner of the ring 36 on the O-ring 58.

After the back face of the primary ring 36 clears the O-ring 58, the primary ring 36 and disc 82 compress the springs 80 to some extent. A second snap ring 100 is fit within the groove 98 at the opposite end from the first snap ring, thus retaining both primary rings 36,64 within the retainer 90. The springs 80 will bias the primary rings 36, 64 outwardly until the respective shoulders 72,37 engage the snap rings 100.

The thicker portion 50 of sleeve 32 is then axially centered within the space defined by the primary rings 36,64 and a plurality of set screws (not shown) is inserted in equidistantly disposed radial bores (not shown) both in the retainer center disk portion 96 and the sleeve thicker portion 50 to connect the retainer 90 to the sleeve 48 and to fix the retainer 90 in the axial and circumferential directions for rotation with the sleeve. The O-ring 56 can be inserted into the inner groove of sleeve 32 at any time when convenient.

The liner assembly 28 together with retaining pin 43, which during manufacture has been press fit within the bore 112 of the liner assembly inner diameter portion 110, is brought up. O-ring 47 is fit within groove 114 and the mating ring 40 is inserted into the liner assembly so that the non-sealing faces on the opposite side of mating ring 40 from the face 42 engage the liner assembly inner diameter portion 110 and the pin 43 is inserted within the bore 41 of mating ring 40. Care must be taken to ensure that the O-ring 45 does not interfere with the insertion of the mating ring 40.

The next assembly step is fitting O-ring 75 around the outer circumferential groove 77 of mating ring 60, and fitting the mating ring 60 within the gland plate 30 so that the outer circumferential surface of mating ring 60 engages the surface 132 of the gland plate 30. An O-ring 138 is disposed in the groove 139 of the gland plate.

The retainer 90 together with all of the appurtenant elements including primary rings 36, 64 and sleeve 32 is then positioned within the liner assembly 28 so that the sealing face 42 of the mating ring 40 engages the sealing face 38 of primary ring 36. The gland plate 30, together with the mating ring 60 is then slid over the thinner portion 51 of sleeve 32 until the sealing faces 62 and 66 engage.

The thicker portion 50 of sleeve 32 is then axially centered within the space defined by the primary rings 36, 64 and a plurality of set screws (now shown) is inserted in equidistantly disposed bores (not shown) both in the retainer center disc portion 96 and the sleeve thicker portion 50 to connect the retainer 90 to the sleeve 32 and to fix the retainer 90 in the axial and circumferential directions for rotation with the sleeve. The O-ring 56 can be inserted into the inner groove of sleeve 32 at any time when convenient.

A gap should become apparent between the liner assembly outer diameter flange portion 120 and the gland plate 30 which results from the springs 80 being in an extended condition, thus biasing the primary rings 36, 64 to the limit of the retainer position permitted by snap rings 100. The gland plate 30 is then positioned relative to the bores of the outer diameter flange portion 120 to maintain alignment for insertion of the bolts 148 which will connect the assembly to the housing 12. The gland plate 30 is then depressed in the axial direction thus pushing towards each other the primary rings 36, 64 while compressing the springs 80. Insertion and tightening of bolts 130 connects the liner assembly 28 to the gland plate 30, and defines the position of the primary rings 36, 64 within the two mating seal faces 42,62. However, the sleeve 32 together with the retainer 90, are axially slidable relative to the position of the primary rings 36, 64.

Once the bolts 130 are tightened and the gland plate 30 is connected to the outer diameter flange portion 120 of liner assembly 28, the seal arrangement 10 is ready for installation on to a shaft 16. A set of spacers 144 is first connected to the outer radial wall of the gland plate at an appropriate radius from the center line by screwing cap screws (not shown) through the radially extending leg of each spacer 144 into the bores in the gland plate 30. The collar 52 is then slipped into the space defined by the other, axially extending leg of each spacer 144 and cap screws attach the spacers 144 to the collar 52. The seal arrangement can then be shipped to an installation site.

A repeller pump (not shown) may be considered as an appropriate example for installation of the seal arrangement. The motor of such a pump (not shown) which would be connected to the shaft 16 at the right side of FIG. 1, would first be disconnected. Any material, such as old packing, would be withdrawn from the stuffing box defined by housing 12, and the surfaces of the shaft, stuffing box and wall 12 would be cleaned of debris or corrosion, if necessary. The seal arrangement, as a cartridge would then be carefully inserted so that the outer diameter wall of the liner assembly inner diameter portion 110 fit within the stuffing box defined by the wall of housing 12, while simultaneously the sleeve 32 fit over the shaft 16. Care must be taken to ensure that the O-ring 56 does not interfere with the slidability of sleeve 32 along the shaft 16.

The seal arrangement cartridge 10 is then slid along the shaft 16 until the radial wall 126 of the liner assembly outer diameter flange portion 120 engages the radial wall of housing 12 while simultaneously compressing O-ring 122 to effect a seal therebetween.

Bolts 148 are then inserted into the appropriate bores through the gland plate 30 and liner assembly outer diameter flange portion 120 and screwed into the threaded bore 150 in the radial wall of housing 12. The bolts 148 fix the stationary portions of the seal arrangement cartridge 10 relative to the housing 12; while the sleeve assembly 32, together with the retainer 90 and primary rings 36, 64, are free to move axially and to rotate with the shaft.

Axial centering of the sleeve assembly 32 is once again performed by the spacers 144 fixing the position of the sleeve assembly 32 and of the retainer 90 which is connected to the sleeve 48. The spacers 144 position the bores 142 through which at the appropriate axial position relative to the shaft 16 so that a small rotation of the shaft 16 disposes the bores 142 of the collar 52 over threaded bores 146 in shaft 16. Set screws 140 are then inserted through the bores 142 of collar 52 and bores 143 in sleeve thinner portion 150 and screwed into the threaded bores 146, thus fixing the position of collar 52 and sleeve assembly 32 relative to the shaft 16. Spacers 144 are then removed by unscrewing the cap screws (not shown) so that the shaft is free to rotate relative to the housing.

Operation of the seal arrangement 10 requires the user to provide a source of a relatively insert gas, such as nitrogen or one of the noble gases, as a buffer fluid. The gas should be supplied at a pressure which exceeds the maximum process fluid pressure by at least 10 p.s.i. The buffer gas pressure may exceed the maximum process fluid pressure by a much greater amount, in which case a regulator may be necessary to decrease the pressure to a desirable level. The supply of the buffer gas is continuously injected into the inlet port 134 and the gas then enters the intermediate chamber 26 through the connecting passage 136.

During shaft rotation, the assembly comprising the retainer 90, the primary rings 36, 64 and the sleeve 32 rotates with the shaft 16. The only point of direct interface between the rotating elements and the stationary elements, fixed relative to the housing 12, is at the interface between the seal faces 38,42 and 62,66 of each of the respective seals 22,24. That is, while the mating ring seal faces 42,62 remain stationary, the primary ring faces 38,66 are rotating relative thereto.

Introduction of a steady stream of a buffer gas into the intermediate chamber 26 at a pressure exceeding both the maximum process fluid pressure within the housing and the pressure in ambient environment external to the housing, usually atmospheric pressure, forces the buffer gas into and through the gap formed by the seal faces during shaft rotation. Thus, the only leakage across the seal faces 38,42 of seal 22 is the buffer gas leakage from the intermediate chamber 26 into the housing chamber 18, and across the seal faces 62,66 of seal 24 is from the intermediate chamber 26 into the ambient environment, such as atmosphere 20.

Actual contact between the seal faces is to be avoided during the rotation of the shaft, but the gap which develops between the seal faces is small enough to maintain only slight leakage of the buffer fluid through each of the seals 22,24. The direct interface between the two sets of seal faces maintains the sealing capacity of one seal between the process fluid contained by the housing and the intermediate chamber and the other seal being between the intermediate chamber and the ambient environment external to the housing.

In the preferred embodiment, the spiral grooves 44 on the mating ring seal face 42 also pump the buffer gas from the intermediate chamber 26 and into the process fluid chamber 18. Ideally, the pumping action of the spiral grooves 44 and the buffer gas pressure act in concert to maintain all leakage across the seal 22 in the desired direction and to inhibit the escape of toxic or corrosive process fluids into the intermediate chamber 26. Moreover, even if some process fluid does leak into the intermediate chamber by accident, the positive pressure of the buffer gas in the other direction would tend to inject the process fluid back into the chamber 18.

The configuration of the seal system together with the positive buffer gas pressure prevents most leakage of the process fluid to atmosphere. A failure of one of the seals would not permit process fluid leakage, because continuous monitoring of the gas pressure in the intermediate chamber 26 would signal the need for a system shutdown in the event that the pressure dropped below a predetermined level. For example, if one of the seals 22, 24 failed, then there would be an immediate pressure drop in the intermediate chamber, which would cause the system to shut down and a cessation of the rotation of the shaft 16. If it was seal 22 which failed, system shutdown would not permit escape of the process fluid from the intermediate chamber 26 because of the static seal provided by dam 76 of the seal ring face 62. Conversely, if seal 24 failed, the static seal provided by dam 46 of seal ring face 42 would prevent process fluid from entering the intermediate chamber, thus permitting only buffer gas to escape from the intermediate chamber.

The advantages provided by the use of the inventive seal arrangement include the elimination of a "wet" buffer fluid such as oil, which can become messy and may contaminate the process fluid. Moreover, oil lubricant is expensive.

In contradistinction, the preferred embodiment of the present application is a dry running seal which has a gas as a lubricant. When equipped with spiral grooves, the seal faces separate to create a gap between the faces and the use of non-contacting type seals results in longer seal life and reduces heat generation resulting from contacting friction. A slight but steady stream of the buffer gas through and across the seal faces acts as a coolant to remove any heat which may be generated by viscous shear between the seal faces. Thus, it is not necessary to circulate the buffer fluid around the seal area since no frictional heat problem arises.

For use with toxic process fluids, use of nitrogen as a buffer gas is approved by environmental regulations and agencies. Moreover, because seal failure will immediately shut down the system, the seal arrangement according to the present invention can be used without constant monitoring of gas effluent for toxic fluid escape.

The inventive seal arrangement is capable of use in a variety of sealing applications, including most pumps. For example, the seal can be used with repeller pumps which evacuate the space in the housing immediately around the seal rings so as to provide at least a partial vacuum. Nitrogen "consumption", i.e. nitrogen injection into the housing chamber, is reduced in a repeller pump because the partial vacuum caused by the repeller permits a lower nitrogen gas buffer pressure. It is nevertheless preferable to maintain a pressure differential between the repeller chamber and the intermediate chamber at about 10 p.s.i.

Whereas a preferred form of the invention has been shown and described, it will be realized that alterations may be made thereto without departing from the scope of the following claims.

What is claimed is:

1. A method for sealing against leakage of process fluid under pressure within a housing along a rotatable shaft extending through a wall of the housing, said method comprising the steps of:

utilizing a seal arrangement having:

a first rotary mechanical end face seal including a stationary seal ring for sealing connection to the housing and a rotary seal ring for sealing connection to the shaft, each said ring having radial surfaces, and each said ring including an annular generally radially extending sealing face, being coextensive with one of said radial surfaces spaced from at least one other of said radial surfaces thereof, and in relatively rotating, mating sealing relation with the sealing face of the other of said rings, one of said seal rings being axially movable relative to the other;

a second rotary mechanical end face seal including a stationary seal ring for sealing connection to the housing and a rotary seal ring for sealing connection to the shaft, each said ring having an annular generally radially extending sealing face in relatively rotating, mating sealing relation with the face of the other of said rings, one of said seal rings of said second rotary mechanical end face seal being axially movable relative to the other said seal ring independently of the axial movement of the axially moveable ring of said first rotary mechanical end face seal;

said first and second rotary mechanical end face seals including means directly biasing each of the axially moveable rings toward its associated stationary ring to maintain said annular sealing face of said axially moveable ring in said relatively rotating sealing relation to said annular sealing face of said stationary ring;

said first and second rotary mechanical end face seals being axially spaced apart along the shaft and arranged to define, with said housing, an intermediate chamber therebetween;

the relatively rotatable seal rings of said first rotary mechanical end face seal having a first annular circumference of said sealing faces exposed to the process fluid to be sealed within the housing, and a second annular circumference of said sealing faces exposed to said intermediate chamber;

the relatively rotatable seal rings of said second rotary mechanical end face seal having a first annular circumference of said sealing faces exposed to said intermediate chamber, and a second annular circumference of said sealing faces exposed to the ambient environment external to said housing;

said intermediate chamber including means for connection to a source of relatively inert gas barrier fluid at a gas barrier fluid pressure exceeding the pressure of said process fluid present at said annular seal face first circumference of said first rotary mechanical end face seal rings;

said first rotary mechanical end face seal including gap-maintaining means to cause said seal to operate, during shaft rotation, as a gas lubricated, non-contacting seal in the presence of said gas barrier fluid at said gas barrier fluid pressure; and said first rotary mechanical end face seal further including means to cause said seal to operate, during shaft rotation, as a contacting seal in the absence of said gas barrier fluid pressure;

supplying a relatively inert gas barrier fluid to said intermediate chamber at a gas barrier fluid pressure exceeding the pressure of said process fluid present at said annular seal face first circumference of said first rotary mechanical end face seal rings;

operating said first rotary mechanical end face seal, during shaft rotation, in the presence of said gas barrier fluid pressure as a gas lubricated, non-contacting seal, and essentially eliminating thrust forces acting on said first rotary mechanical end face seal, by providing said first rotary mechanical end face seal with a first secondary sealing means disposed between one of said seal rings and the housing for providing a sealing connection therebetween and a second secondary sealing means disposed between the other seal ring and the shaft for providing a sealing connection therebetween, to define the boundary between said intermediate chamber and said process fluid within said housing, and sizing and disposing said first and second secondary sealing means of said first rotary mechanical end face seal to define radial walls in said other radial surfaces and thereby presenting essentially an equal area at an approximately identical radius, such that the essentially same amount of buffer fluid pressure acts on the radial surfaces of each of said rings of said first rotary mechanical end face seal but in opposite directions and on the process fluid side, the identical process fluid pressure thereby acting on opposite sides of a portion of each of said respective rings of said first rotary mechanical end face seal to essentially eliminate thrust forces acting on said first rotary mechanical end face seal.

2. A method as claimed in claim 1 wherein said source of relatively inert gas supplies to the intermediate chamber a relatively inert gas which comprises at least one gas taken from the group of nitrogen, carbon dioxide, air or one of the noble gases.

3. A method as claimed in claim 1 wherein said first and second mechanical end face seals are provided preassembled together as a cartridge and are installed as a unit.

4. A seal arrangement for sealing against leakage of process fluid under pressure within a housing process fluid chamber along a rotatable shaft extending through a wall of the housing, said seal arrangement comprising:

a first rotary mechanical end face seal including a stationary seal ring for sealing connection to the housing and a rotary seal ring for sealing connection to the shaft, each said ring having a radial surface including an annular generally radially extending sealing face and at least one other radial surface, said sealing face spaced from the other of said radial surfaces thereof, and said sealing face being in relatively rotating, mating sealing relation with the sealing face of the other of said rings, one of said rings being axially moveable relative to the other;

a second rotary mechanical end face seal including a stationary seal ring for sealing connection to the housing and a rotary seal ring for sealing connection to the shaft, each said ring having an annular generally radially extending sealing face in relatively rotating, mating sealing relation with the face of the other of said rings, one of said seal rings being axially movable relative to the other said seal ring independently of the axially moveable ring of said first rotary mechanical end face seal;

said first and second rotary mechanical end face seals including means directly biasing each of the axially moveable rings toward its associated stationary ring to maintain said annular sealing face of said axially moveable ring in said relatively rotating sealing relation with said annular sealing face of said stationary ring;

said first and second rotary mechanical end face seals being axially spaced apart along the shaft and arranged to define, with said housing, an intermediate chamber therebetween;

the relatively rotatable seal rings of said first rotary mechanical end face seal having a first annular circumference of said sealing faces exposed to the process fluid to be sealed within the housing process fluid chamber, and a second annular circumference of said sealing faces exposed to said intermediate chamber;

the relatively rotatable seal rings of said second rotary mechanical end face seal having a first annular circumference of said sealing faces exposed to said intermediate chamber, and a second annular circumference of said sealing faces exposed to the ambient environment external to said housing;

said intermediate chamber including means for connection to a source of relatively inert buffer gas at a pressure exceeding the pressure of said process fluid present at said circumference of said sealing faces exposed to the process fluid;

said first rotary mechanical end face seal including gap maintaining means defined by said relatively rotating sealing faces to maintain said seal faces at a gap during shaft rotation in the presence of said buffer gas at said pressure exceeding the pressure of said process fluid present at said circumference of said sealing faces exposed thereto;

said first rotary mechanical end face seal further including a first secondary sealing means disposed between one of said seal rings and the housing for sealing therebetween and a second secondary sealing means disposed between the other of said seal rings and the shaft for sealing therebetween, said first and second secondary sealing means each defining the boundary between said intermediate chamber and said process fluid chamber, said first and second secondary sealing means of said first rotary mechanical end face seal being sized and disposed to define radial walls in said other radial surfaces to thereby present essentially an equal area at an approximately identical radius, such that essentially the same amount of buffer fluid pressure acts on said other radial surfaces of each of said rings of said first rotary mechanical end face seal but in opposite directions and, on the process fluid side, the identical process fluid pressure acts on opposite sides of a portion of said respective rings of said first rotary mechanical end face seal essentially eliminating thrust forces acting on said first rotary mechanical end face seal.

5. The seal arrangement as claimed in claim 4 wherein said first and second secondary sealing means include an O-ring disposed in sealing relation between said stationary seal ring and one of said housing and shaft and an O-ring disposed in sealing relation between said rotary seal ring and the other of said housing and shaft.

6. The seal arrangement as claimed in claim 5 wherein said gap maintaining means comprises a plurality of grooves formed on one of said relatively rotating sealing faces extending from said circumference exposed to said intermediate chamber toward said other circumference, said one of said relatively rotating sealing faces further defining a sealing dam between said grooves and said other circumference.

7. The seal arrangement as claimed in claim 6 wherein said grooves are spiral grooves.

8. The seal arrangement as claimed in claim 5 wherein said secondary sealing means associated with said axially moveable seal ring includes a radial wall associated with said one of said shaft and housing, said radial wall being in fixed axial position and disposed adjacent said O-ring in sealing relation between said axially moveable ring and said one of said shaft and housing.

9. The seal arrangement as claimed in claim 6 wherein said secondary sealing means associated with said axially moveable seal ring includes a radial wall associated with said one of said shaft and housing, said radial wall being in fixed axial position and disposed adjacent said O-ring in sealing relation between said axially moveable ring and said one of said shaft and housing.

10. The seal arrangement as claimed in claim 7 wherein said secondary sealing means associated with said axially moveable seal ring includes a radial wall associated with said one of said shaft and housing, said radial wall being in fixed axial position and disposed adjacent said O-ring in sealing relation between said axially moveable ring and said one of said shaft and housing.

11. The seal arrangement of claim 4 said axially moveable ring of said first rotary mechanical end face seal further includes a radially extending surface spaced from said radial sealing face, said surface being exposed to the pressure of the process fluid in said process fluid chamber.

12. The seal arrangement of claim 5 said axially moveable ring of said first rotary mechanical end face seal further includes a radially extending surface spaced from said radial sealing face, said surface being exposed to the pressure of the process fluid in said process fluid chamber.

13. The seal arrangement of claim 6 said axially moveable ring of said first rotary mechanical end face seal further includes a radially extending surface spaced from said radial sealing face, said surface being exposed to the pressure of the process fluid in said process fluid chamber.

14. The seal arrangement of claim 7 said axially moveable ring of said first rotary mechanical end face seal further includes a radially extending surface spaced from said radial sealing face, said surface being exposed to the pressure of the process fluid in said process fluid chamber.

15. The seal arrangement of claim 8 said axially moveable ring of said first rotary mechanical end face seal further includes a radially extending surface spaced from said radial sealing face, said surface being exposed to the pressure of the process fluid in said process fluid chamber.

16. The seal arrangement of claim 8 said axially moveable ring of said first rotary mechanical end face seal further includes a radially extending surface spaced from said radial sealing face, said surface being exposed to the pressure of the process fluid in said process fluid chamber.

17. The seal arrangement of claim 10 said axially moveable ring of said first rotary mechanical end face seal further includes a radially extending surface spaced from said radial sealing face, said surface being exposed to the pressure of the process fluid in said process fluid chamber.

18. A seal arrangement as claimed in claim 4 wherein said relatively inert gas is taken from the group consisting of nitrogen, carbon dioxide, air and a noble gas.

19. A seal arrangement as claimed in claim 4 wherein said gap maintaining means on the seal face of one of said rings of said first rotary mechanical end face seal are formed on said stationary seal ring.

20. A seal arrangement as claimed in claim 19 wherein said stationary seal ring sealed against the housing of said first rotary mechanical end face seal is a mating ring and said rotary seal ring sealed against said shaft is an axially moveable primary ring which is biased by said biasing means.

21. A seal arrangement as claimed in claim 6 wherein said grooves on the seal face of one of said rings of said first rotary mechanical end face seal extend from the outer diameter toward the inner diameter of said seal ring face and the dam is adjacent the inner diameter of said seal ring face.

22. The seal arrangement of claim 4 further comprising a sleeve sealingly connected to said shaft, said sleeve being disposed between said shaft and said axially moveable ring of said first rotary mechanical end face seal, said axially moveable ring being disposed around said sleeve, said axially moveable ring rotating with said shaft and said sleeve, one of said second secondary sealing means providing a seal between a cylindrical surface of said axially moveable ring and said sleeve while permitting axial movement of said axially moveable ring relative to said sleeve, and said seal arrangement including at least one radially extending secondary seal wall retained in fixed axial position relative to said sleeve.

23. A seal arrangement as claimed in claim 22 wherein said first and second seals are preassembled as a cartridge for installation.

24. A seal arrangement as claimed in claim 23 wherein said means biasing each of the axially moveable rings toward the other for each of said first and second rotary mechanical end face seals comprises a common spring which biases each of the axially moveable rings outwardly from a location central to both of said axially moveable rings.

25. A seal arrangement as claimed in claim 21, wherein the radial face of one of said rings of said second rotary mechanical end face seal includes a plurality of grooves extending from said circumference exposed to said intermediate chamber partially toward said circumference exposed to the ambient environment external to said housing and defining an annular dam adjacent said circumference exposed to the ambient environment external to said housing.

26. A seal arrangement as claimed in claim 25 wherein said grooves on the seal face of one of said rings of said second rotary mechanical end face seal extend from the outer diameter toward the inner diameter of said seal ring face and the dam is adjacent the inner diameter of said seal ring face.

* * * * *